United States Patent
Sanemasa et al.

(10) Patent No.: US 12,304,067 B2
(45) Date of Patent: May 20, 2025

(54) TRANSFER ROBOT AND ROBOT SYSTEM

(71) Applicant: KABUSHIKI KAISHA YASKAWA DENKI, Fukuoka (JP)

(72) Inventors: Hiroki Sanemasa, Fukuoka (JP); Ryosuke Watanabe, Fukuoka (JP); Osamu Harada, Fukuoka (JP); Osamu Komiyaji, Fukuoka (JP); Masanobu Kakihara, Fukuoka (JP); Yuki Honda, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 18/199,649

(22) Filed: May 19, 2023

(65) Prior Publication Data
US 2023/0381948 A1 Nov. 30, 2023

(30) Foreign Application Priority Data
May 27, 2022 (JP) .................. 2022-087041

(51) Int. Cl.
*B25J 9/00* (2006.01)
*B25J 9/04* (2006.01)
*B25J 19/00* (2006.01)

(52) U.S. Cl.
CPC ........... *B25J 9/0009* (2013.01); *B25J 9/042* (2013.01); *B25J 19/0041* (2013.01)

(58) Field of Classification Search
CPC .......... B25J 9/043; B25J 18/04; B25J 9/042
See application file for complete search history.

(56) References Cited

U.S. PATENT DOCUMENTS

| | | | |
|---|---|---|---|
| 6,485,250 B2* | 11/2002 | Hofmeister | B25J 9/06 414/744.1 |
| 8,573,919 B2* | 11/2013 | Gilchrist | B25J 9/10 414/744.5 |
| 9,202,733 B2 | 12/2015 | Hosek et al. | |
| 11,167,419 B2* | 11/2021 | Harada | H01L 21/67742 |
| 11,426,865 B2* | 8/2022 | Gilchrist | B25J 18/04 |

(Continued)

FOREIGN PATENT DOCUMENTS

| | | |
|---|---|---|
| CN | 113442162 A | 9/2021 |
| JP | H03-281183 A | 12/1991 |

(Continued)

OTHER PUBLICATIONS

Twain Office Action dated Apr. 2, 2024 for TW application No. 112119765 (Taiwan counterpart of this application) and Machine translation therof (11 pages).

(Continued)

*Primary Examiner* — Jake Cook
(74) *Attorney, Agent, or Firm* — Venjuris, P.C.

(57) ABSTRACT

A transfer robot includes a plurality of hands, a plurality of hand drive motors, and an arm. The plurality of hands are capable of holding a transfer target object, and pivot individually around a pivoting axis. The plurality of hand drive motors are arranged in a direction following the pivoting axis, such that a motor axis to which the plurality of hands are each connected becomes concentric with the pivoting axis, and directly drive the plurality of hands, respectively. The arm includes therein the plurality of hand drive motors.

16 Claims, 10 Drawing Sheets

(56) References Cited

U.S. PATENT DOCUMENTS

| | | | | |
|---|---|---|---|---|
| 2003/0011338 | A1* | 1/2003 | Gilchrist | H01L 21/67742 |
| | | | | 318/568.21 |
| 2007/0020081 | A1* | 1/2007 | Gilchrist | H01L 21/67742 |
| | | | | 414/744.5 |
| 2013/0195599 | A1* | 8/2013 | Furuichi | B25J 19/0029 |
| | | | | 414/744.5 |
| 2013/0195600 | A1* | 8/2013 | Furuichi | B25J 9/043 |
| | | | | 414/744.5 |
| 2017/0062264 | A1* | 3/2017 | Tang | H01L 21/68707 |
| 2019/0030726 | A1* | 1/2019 | Furukawa | B25J 15/0052 |
| 2020/0016765 | A1* | 1/2020 | Kitahara | B65G 47/904 |
| 2020/0230819 | A1* | 7/2020 | Shimazaki | B25J 9/102 |
| 2021/0299859 | A1 | 9/2021 | Okita et al. | |
| 2022/0131452 | A1* | 4/2022 | Kojima | B25J 9/126 |

FOREIGN PATENT DOCUMENTS

| | | |
|---|---|---|
| JP | H11-033947 A | 2/1999 |
| JP | 2001-332599 A | 11/2001 |
| JP | 2001-347477 A | 12/2001 |
| JP | 2016-162936 A | 9/2016 |
| JP | 2020-011303 A | 1/2020 |
| KR | 10-2014-0010562 A | 1/2014 |
| KR | 10-2166829 B1 | 10/2020 |

OTHER PUBLICATIONS

A Notice of Reasons for Refusal dated Apr. 2, 2024, issued from the Japan Patent Office (JPO) of Japanese Patent Application No. 2022-087041 and a Machine English translation thereof (8 pages).
The website of CKD Nikki Denso Co., LTD and EN Machine translation thereof < https://www.nikkidenso.co.jp/dd - motor/knowledge.htm> (12 pages).
An Office Action dated Aug. 13, 2024, issued from the Jpanese Patent Office (JPO) of Japanese Patent Application No. 2022-087041 (Japanese counterpart of the present application) and EN Machine translation thereof. (9 pages).
An Office Action dated Sep. 20, 2024, issued from the Korean Intellectual Property Office (KIPO) of Korean Patent Application No. 10-2023-0050641(Korean counterpart of the present application) and a EN Machine translation thereof. (20 pages).

* cited by examiner

TRANSFER ROBOT AND ROBOT SYSTEM

CROSS-REFERENCE TO RELATED APPLICATIONS

This application is based on and claims priority from Japanese Patent Application No. 2022-087041, filed on May 27, 2022, with the Japan Patent Office, the disclosure of which is incorporated herein in its entirety by reference.

TECHNICAL FIELD

The present disclosure relates to a transfer robot and a robot system.

BACKGROUND

In related art, transfer robots such as horizontal articulated robots have been known, which transfer a transfer target object by moving a hand holding the object.

Further, in an effort to miniaturize the arm of the transfer robot, a type of transfer robot has been proposed, which adopts an arm-integrated built-in motor (see, e.g., Japanese Patent Laid-Open Publication No. 2020-011303).

SUMMARY

In the related art described above, the arm supporting the hand includes therein the built-in motor and a belt for transmitting a driving force of the motor to the hand, and therefore, an improvement is needed from the viewpoint of downsizing the arm.

An aspect of an embodiment of the present disclosure provides a transfer robot and a robot system, which may implement the downsizing of an arm.

According to an aspect of an embodiment of the present disclosure, a transfer robot includes a plurality of hands, a plurality of hand drive motors, and an arm. The plurality of hands are capable of holding a transfer target object, and pivot individually around a pivoting axis. The plurality of hand drive motors are arranged in a direction along the pivoting axis, such that a motor axis to which the plurality of hands are each connected becomes concentric with the pivoting axis, and directly drive the plurality of hands, respectively. The arm includes therein the plurality of hand drive motors.

According to an aspect of another embodiment of the present disclosure, a robot system includes the transfer robot described above, and a controller that controls an operation of the transfer robot.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings which form a part hereof. The illustrative embodiments described in the detailed description, drawings, and claims are not meant to be limiting. Other embodiments may be utilized, and other changes may be made without departing from the spirit or scope of the subject matter presented herein.

Hereinafter, a transfer robot and a robot system of the present disclosure will be described in detail with reference to the drawings. Meanwhile, the present disclosure is not limited to the embodiments described herein below.

In the embodiments, expressions such as "parallel," "vertical," "symmetrical," "circular," "semicircular," and "same" may be used, but these conditions may not be strictly satisfied. That is, the expressions may allow deviations in, for example, manufacturing accuracy, installation accuracy, processing accuracy, and detection accuracy.

Figure 1:
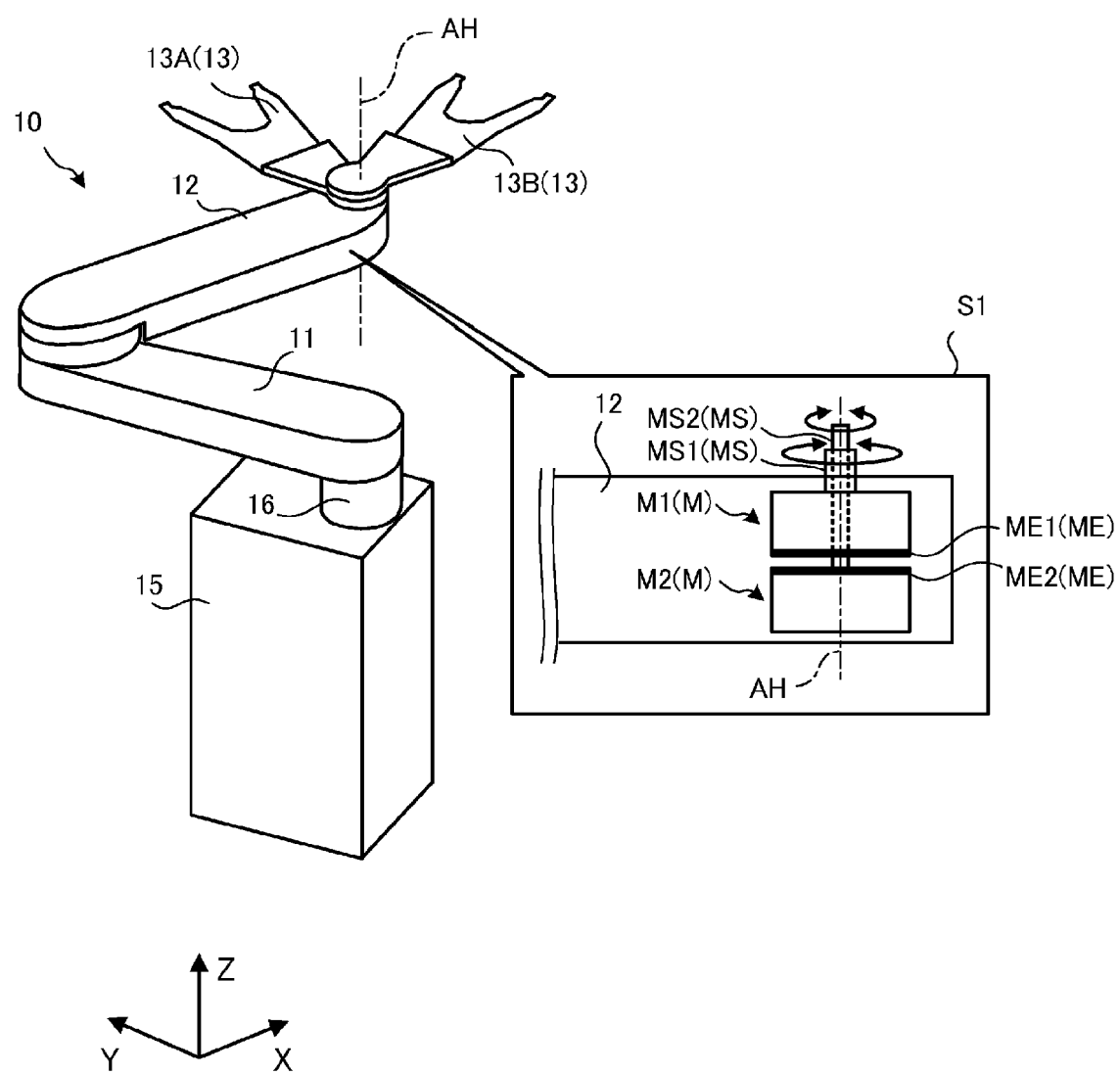
FIG. 1 is a schematic view illustrating an outline of a transfer robot.

First, an outline of a transfer robot 10 according to an embodiment will be described using FIG. 1. FIG. 1 is a schematic view illustrating the outline of the transfer robot 10. FIG. 1 illustrates a perspective view of the transfer robot 10 when viewed obliquely from above, and also illustrates a transparent side view of a second arm 12 (see, e.g., S1 of FIG. 1).

To facilitate the understanding of description, FIG. 1 illustrates a three-dimensional orthogonal coordinate system with a Z axis having the vertical upward direction as a positive direction, an X axis having a positive direction toward the distal end of an arm supporting hands in the extending direction of the arm, and a Y axis orthogonal to the X and Z axes. The other drawings to be used for the descriptions herein below may also illustrate the orthogonal coordinate system. The "orthogonal" indicates not only "being perpendicular" but also "intersecting."

As illustrated in FIG. 1, the transfer robot 10 includes a main body 15 provided on, for example, a floor surface, and a lifting unit 16 that moves up and down with respect to the main body 15. The lifting unit 16 moves upward and downward a first arm 11 and a second arm 12, which are horizontal link type arms. A plurality of hands 13 is provided on the distal end of the second arm 12. Specifically, the second arm 12, which is an arm supporting the plurality of hands 13, supports two hands 13 on the upper surface of the distal end thereof.

The plurality of hands 13 may each hold a transfer target object such as a semiconductor substrate, and pivot individually and coaxially around a motor axis AH. That is, the plurality of hands 13 pivot separately around one pivoting axis. Here, when distinguishing the plurality of hands 13, the hand 13 closest to the second arm 12 and the other hand 13 will be identified with the uppercase alphabets of A and B, respectively, added to the ends of their reference numerals.

While FIG. 1 illustrates two hands 13, the number of hands 13 may be three or more. Further, while FIG. 1 illustrates two arms (e.g., the first arm 11 and the second arm 12) as the horizontal link type arms, the number of horizontal link type arms may be one or three or more.

As illustrated in S1 of FIG. 1, the second arm 12 includes therein two hand drive motors M that directly drive the two hands 13, respectively, in a posture of being aligned in the direction along the motor axis AH while being concentric with the motor axis AH. That is, the two hand drive motors M are arranged in the direction along the pivoting axis of the hands 13, such that the motor axis AH to which the hands 13 are each connected becomes concentric with the pivoting axis of the hands 13. Further, the hand drive motors M directly drive the connected hands 13, respectively. When distinguishing the plurality of hand drive motors M, they will be identified with reference numerals ending with numbers, such as M1 and M2.

As described above, the hand drive motors M are so-called direct drive motors, which directly drive the hands 13, respectively. When the arm includes therein the plurality of hand drive motors M in the posture of being aligned in the direction along the motor axis AH while being concentric with the motor axis AH, the space for accommodating the motors may be reduced. Further, when the hand drive motors M are direct drive motors, a drive belt may be omitted. As a result, the arm may be downsized.

As illustrated in S1 of FIG. 1, each hand drive motor M includes an encoder ME and a hollow shaft MS. Here, each hand drive motor M is a so-called hollow motor having a hollow passing through the motor along the motor axis AH. The encoder ME is provided on the surface of one side (e.g., one-side end surface) of the motor in the direction along the motor axis AH.

The hollow shaft MS is connected to the rotor of the hand drive motor M, extends along the motor axis AH, and rotates around the motor axis AH. The hollow of the hand drive motor M communicates with the hollow of the hollow shaft MS, and the encoder ME is provided at a position on the hand drive motor M excluding the hollow.

In the example illustrated in FIG. 1, a hollow shaft MS2 of the hand drive motor M2 passes through the hand drive motor M1 and a hollow shaft MS1. The second arm 12 includes the hand drive motors M1 and M2 in a posture where the hollow shafts MS1 and MS2 protrude from the upper surface of the second arm 12. A hand 13A is connected to the hollow shaft MS1, and a hand 13B is connected to the hollow shaft MS2. The hollow shaft MS2, which is the inner hollow shaft MS, pivots the hand 13B, which is the upper hand 13; and the hollow shaft MS1, which is the outer hollow shaft MS, pivots the hand 13A, which is the lower hand 13. That is, the hollow shaft MS1 pivots the hand 13A, and the hollow shaft MS2, which is positioned in an inner side than the hollow shaft MS1, pivots the hand 13B positioned in an upper side than the hand 13A. In other words, the hand drive motor M2, which is the lower hand drive motor M, pivots the hand 13B, which is the upper hand 13; and the hand drive motor M1, which is the upper hand drive motor M, pivots the hand 13A, which is the lower hand 13.

That is, the hand drive motor M1 directly drives the hand 13A, and the hand drive motor M2 directly drives the hand 13B, without using a mechanism such as a belt for transmitting a driving force. When the number of hands 13 is three or more, the second arm 12 includes the same number of hand drive motors M as the number of hands 13, allowing to be concentric with the motor axis AH.

Here, the hand drive motor M may be a so-called radial gap motor or an axial gap motor. The radial gap motor refers to a motor in which the rotor and the stator face each other in the radial direction of the motor axis AH. The axial gap motor refers to a motor in which the rotor and the stator face each other in the direction along the motor axis AH. Since the axial gap motor is more useful in reducing the thickness of a motor, that is, the height of a motor than the radial gap motor, the axial gap motor may be used to make the second arm 12 thin.

When the hand drive motor M is a radial gap built-in motor, the stator of the motor is usually shrink-fitted into the arm. Meanwhile, when the hand drive motor M is an axial gap built-in motor, the stator of the motor may be fixed to the arm in the direction along the motor axis AH by a bolt or the like. Therefore, even from the viewpoint of reducing assembly man-hours, the axial gap motor may be used as the hand drive motor M.

The hand drive motor M may be a motor having a housing that covers the rotor and the stator, or may be a so-called built-in motor that is directly attached to the frame of the second arm 12 without including a housing.

As illustrated in S1 of FIG. 1, the second arm 12 includes therein the plurality of hand drive motors M in a posture where the encoders ME face each other. That is, the plurality of hand drive motors M each have the encoder ME on the surface of one side thereof in the direction along the motor axis AH, and are built in one arm in the posture where the encoders ME face each other. By arranging the plurality of hand drive motors M in the posture where the encoders ME provided on the end surfaces of the hand drive motors M face each other, wires of the encoders ME may be gathered nearby. Further, the space required for the wiring may be reduced. Therefore, the arm may be downsized.

Further, the second arm 12 includes each of the plurality of hand drive motors M in a posture where the hollow shaft MS of one of the hand drive motors M is inserted into the hollow shaft MS of the other hand drive motor M. That is, the plurality of hand drive motors M each include the hollow shaft MS connected to the rotor and extending along the motor axis AH, and are built in one arm in the posture where the hollow shaft MS of one of the hand drive motors M is inserted into the hollow shaft MS of the other hand drive motor M.

With the nested arrangement of the hollow shafts MS of the plurality of hand drive motors M, the space for accommodating the hand drive motors M may be reduced. Thus, the arm may be downsized.

The case where the hand drive motor M is the axial gap motor will be described later using FIGS. 7 to 9.

Figure 2:
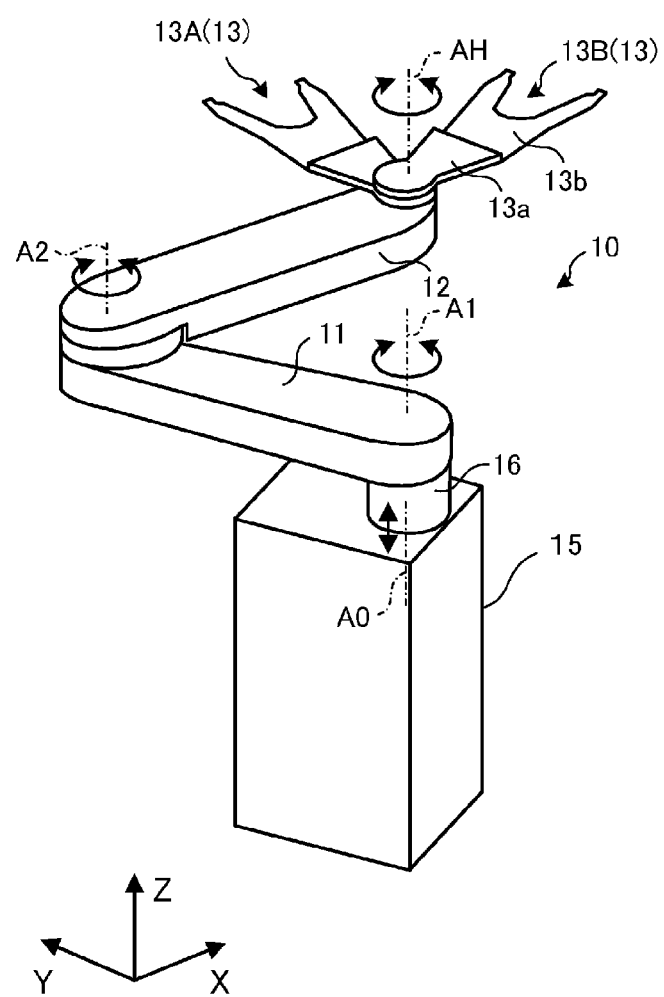
FIG. 2 is a perspective view illustrating the transfer robot.

Next, the configuration of the transfer robot 10 is further described using FIG. 2. FIG. 2 is a perspective view of the transfer robot 10. As illustrated in FIG. 2, the transfer robot 10 includes the main body 15, the lifting unit 16, the first arm 11, the second arm 12, and the plurality of hands 13.

While FIG. 2 illustrates the transfer robot 10 provided with the two hands 13A and 13B, the number of hands 13 may be arbitrary. In FIG. 2, a lifting axis A0, a first axis A1, a second axis A2, and the motor axis AH may be parallel to each other.

The main body 15 includes therein a mechanism that moves the lifting unit 16 up and down. The lifting unit 16 moves up and down along the lifting axis A0 illustrated in FIG. 2, and supports the proximal end of the first arm 11 to be rotatable around the first axis A1. The lifting unit 16 itself may rotate around the first axis A1.

The first arm 11 supports the proximal end of the second arm 12 at the distal end thereof to be rotatable around the second axis A2. The second arm 12 supports the proximal ends of the hands 13A and 13B to be individually rotatable around the motor axis AH. Each of the hands 13A and 13B has a base 13A and a fork 13B.

The transfer robot 10 is a three-link horizontal articulated robot with the first arm 11, the second arm 12, and the hands 13. Since the transfer robot 10 includes the lifting mechanism as described above, the transfer robot 10 may access each of transfer target objects such as substrates, which are disposed at different heights. The transfer robot 10 may be a two-link horizontal articulated robot with the second arm 12 and the hands 13, excluding the first arm 11.

Figure 3:
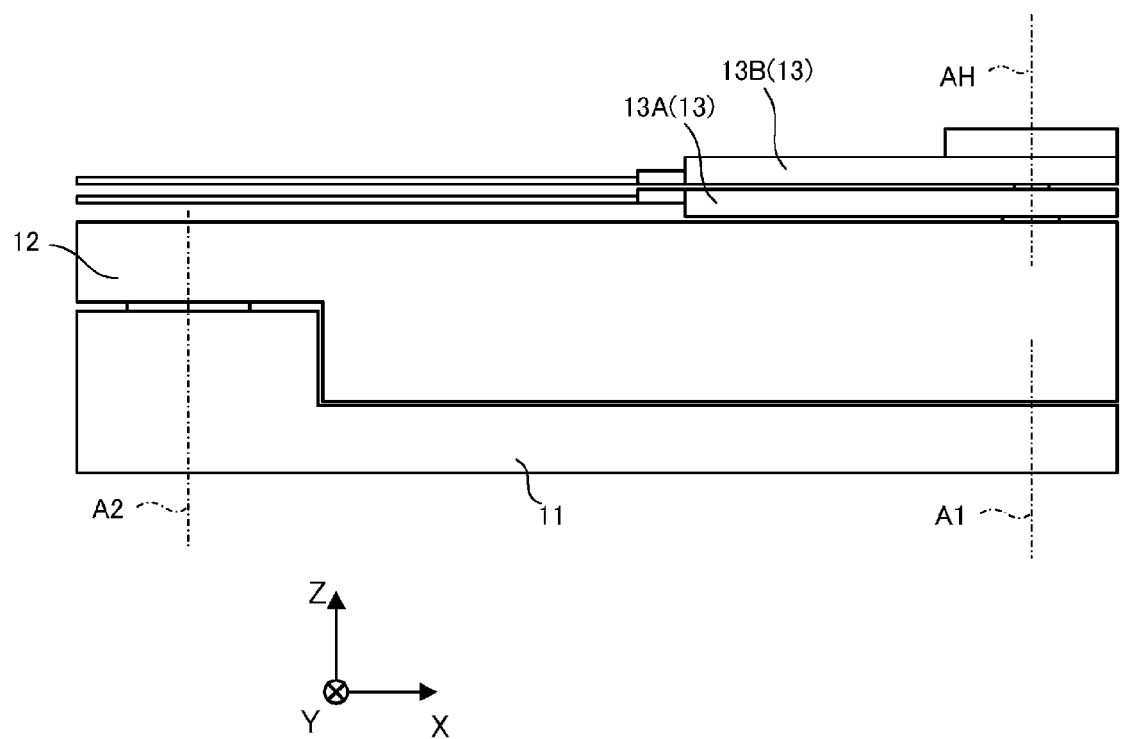
FIG. 3 is a schematic side view of a first arm, a second arm, and a hand.

Next, the outward appearance of the first arm 11, the second arm 12, and the hands 13 will be described using FIG. 3. FIG. 3 is a schematic side view of the first arm 11, the second arm 12, and the hands 13. FIG. 3 illustrates the first arm 11, the second arm 12, and the hands 13 in a folded posture.

FIG. 3 illustrates the first axis A1, the second axis A2, and the motor axis AH illustrated in FIG. 2, for reference. The "folded posture" indicates a posture where the distal end of the second arm 12 is directed toward the proximal end of the first arm 11, and the distal ends of the hands 13 are directed toward the proximal end of the second arm 12.

As illustrated in FIG. 3, the lower surface of the first arm 11 is substantially flat. The upper surface of the first arm 11 has a stepped shape, in which the upper surface of the end on the side of the second axis A2 is higher than the upper surface of the end on the side of the first axis A1. In this way, the upper surface of the end on the side of the second axis A2 protrudes toward the second arm 12, in order to include a motor for driving the second arm 12 inside the first arm 11.

As illustrated in FIG. 3, the upper surface of the second arm 12 is substantially flat. The lower surface of the second arm 12 has a stepped shape, in which the lower surface of the end on the side of the second axis A2 is higher than the lower surface of the other end. In this way, the lower surface of the end on the side of the second axis A2 is more recessed than the lower surface of the other end, in order to avoid the protruding shape of the first arm 11 described above.

As described above, when viewed from side, the second arm 12 has a shape, in which the other end is thicker than the end corresponding to the second axis A2 and protrudes toward the first arm 11. Accordingly, since the thicker portion has the large volume, a space may be easily secured for accumulating the hand drive motors M that drive the hands 13 (see, e.g., FIG. 1) in the posture of being arranged along the motor axis AH.

The hands 13 are provided on the upper surface of the end of the second arm 12 opposite to the end thereof on the side of the second axis A2. When viewed from the second arm 12, two hands 13 are provided in an order of the hand 13A and the hand 13B along the motor axis AH.

The second arm 12 may be configured by attaching a plurality of detachable and separable subframes to a base frame, and this configuration will be described later using FIGS. 5A and 5B.

Figure 4A:
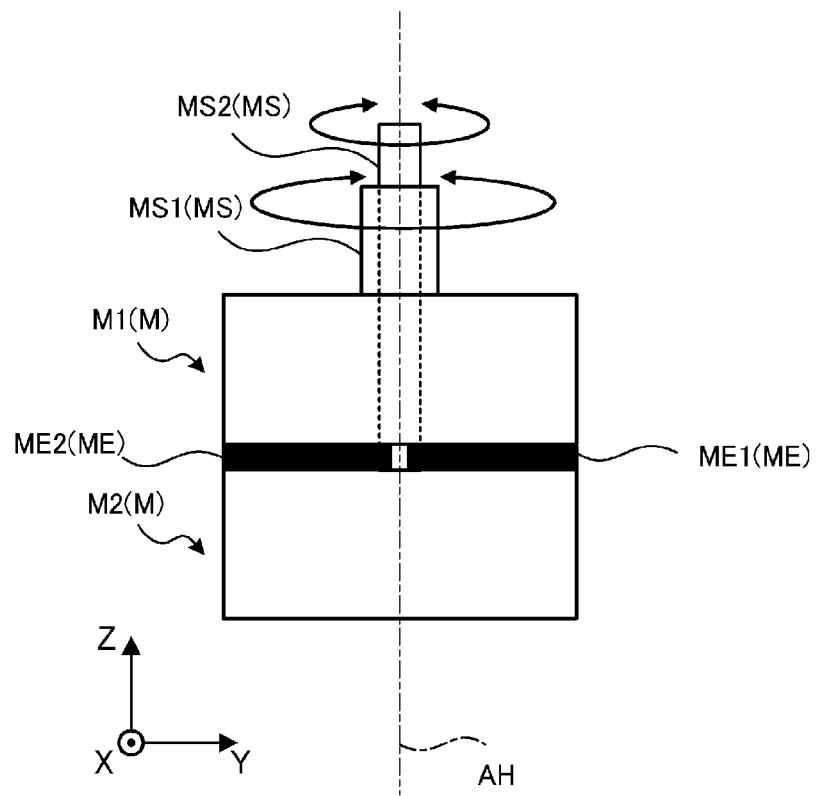
FIG. 4A is a schematic side view of a plurality of hand drive motors in a combined state.

Next, descriptions will be made on a case where the encoder ME of each hand drive motor M has a shape fitted into a semicircular-disk outer shape, using FIGS. 4A and 4B. FIG. 4A is a schematic side view of the plurality of hand drive motors M in a combined state, and FIG. 4B is a schematic top view of the same.

Figure 4B:
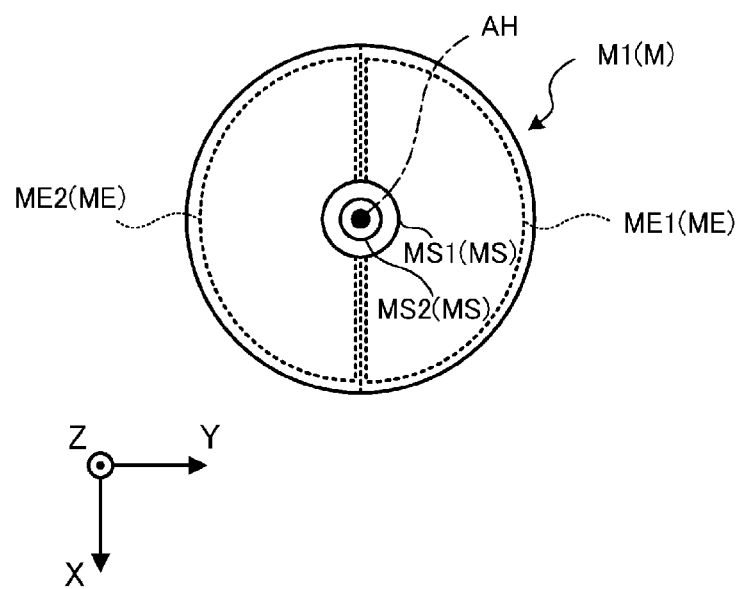
FIG. 4B is a schematic top view of the plurality of hand drive motors in the combined state.

Here, the encoders ME in FIGS. 4A and 4B are different from the encoders ME illustrated in FIG. 1, in that the encoders ME of FIGS. 4A and 4B each have the shape fitted into the semicircular-disk outer shape and are arranged at the same height in the direction along the motor axis AH.

Each encoder ME includes a disk-shaped disk portion fixed to the end surface of the rotor of the hand drive motor M, and a detection portion having a shape fitted into a semicircular outer shape obtained by equally dividing the disk portion. To simplify the description, FIGS. 4A and 4B omit the disk portion, and illustrates only the detection portion. It is assumed that the outer shape of the disk portion is the same as the outer shape of the end surface of each hand drive motor M.

As illustrated in FIG. 4A, the encoder ME1 of the hand drive motor M1 and the encoder ME2 of the hand drive motor M2 are arranged to at least partially overlap with each other in the direction along the motor axis AH. From the viewpoint of implementing the height reduction, the encoders ME1 and ME2 may have substantially the same height. FIGS. 4A and 4B illustrate an example where the encoder ME1 is disposed on the positive side of the Y axis with respect to the motor axis AH, and the encoder ME2 is disposed on the negative side of the Y axis with respect to the motor axis AH. Without being limited thereto, the encoders ME1 and ME2 may be disposed at positions rotated by an arbitrary angle around the motor axis AH, respectively.

As illustrated in FIG. 4B, the encoder ME1 of the hand drive motor M1 and the encoder ME2 of the hand drive motor M2 take a posture where the side surfaces of the encoders ME1 and ME2 face each other across the motor axis AH. That is, the plurality of hand drive motors M are built in one arm in a posture where in the respective encoders ME of the motors, the end surfaces of the disk portions face each other across the detection portions, and the side surfaces of the detection portions face each other across the motor axis AH (see, e.g., FIG. 1). The shape of each encoder ME may be arbitrary such as a fan shape or an irregular shape, as long as the encoder may be disposed in the area corresponding to the semicircular shape.

In this way, the encoders ME each have the shape fitted into the semicircular outer shape, and are arranged to face each other across the motor axis AH, so that the total height of the plurality of hand drive motors M in the combined state may be reduced. Therefore, the arm may be made thin.

Next, the configuration of the second arm 12 illustrated in, for example, FIG. 3 will be described using FIGS. 5A and 5B. FIG. 5A is a schematic side view illustrating subframes 12S each having a built-in motor, and FIG. 5B is a schematic side view illustrating the assembled arm.

Figure 5A:
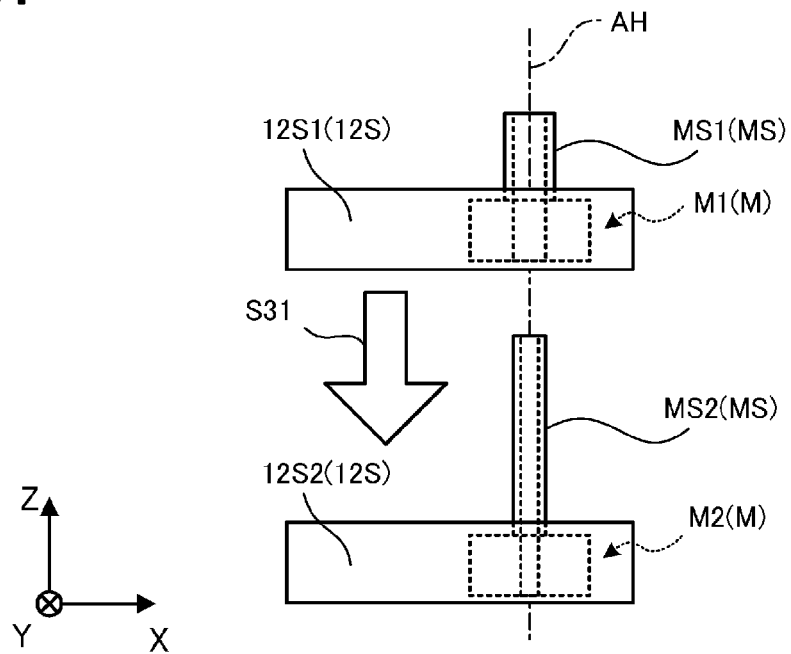
FIG. 5A is a schematic side view illustrating a subframe with a built-in motor.

As illustrated in FIG. 5A, a subframe 12S1, which is one of the subframes 12S, includes the built-in hand drive motor M1. A subframe 12S2 includes the built-in hand drive motor M2. The hollow shaft MS1 of the hand drive motor M1 protrudes from the subframe 12S1 along the motor axis AH. The hollow shaft MS2 of the hand drive motor M2 protrudes from the subframe 12S2 along the motor axis AH.

Here, for example, by moving the subframe 12S1 in a direction S31, the hollow shaft MS2 of the hand drive motor M2 may be inserted into the hollow of the hand drive motor M1. Then, when the subframes 12S1 and 12S2 are fixed together in the state where the lower surface of the subframe 12S1 and the upper surface of the subframe 12S2 are in contact with each other, the subframes 12S1 and 12S2 may be assembled. In the assembled state, the tip of the hollow shaft MS2 protrudes from the tip of the hollow shaft MS1.

That is, the portion of the second arm 12 (see, e.g., FIG. 3) that supports the plurality of hands 13 may be disassembled into the plurality of subframes 12S along the motor axis AH, and each hand drive motor M is fixed to each subframe 12S illustrated in FIG. 5A. That is, the second arm 12 includes the plurality of subframes 12S, which may be disassembled along the motor axis AH, on the side of the plurality of hands 13. The subframes 12S include therein the plurality of hand drive motors M on the one-to-one basis. In this way, the hand drive motors M are built in the separable subframes 12S, respectively, so that the arm may easily be assembled.

Figure 5B:
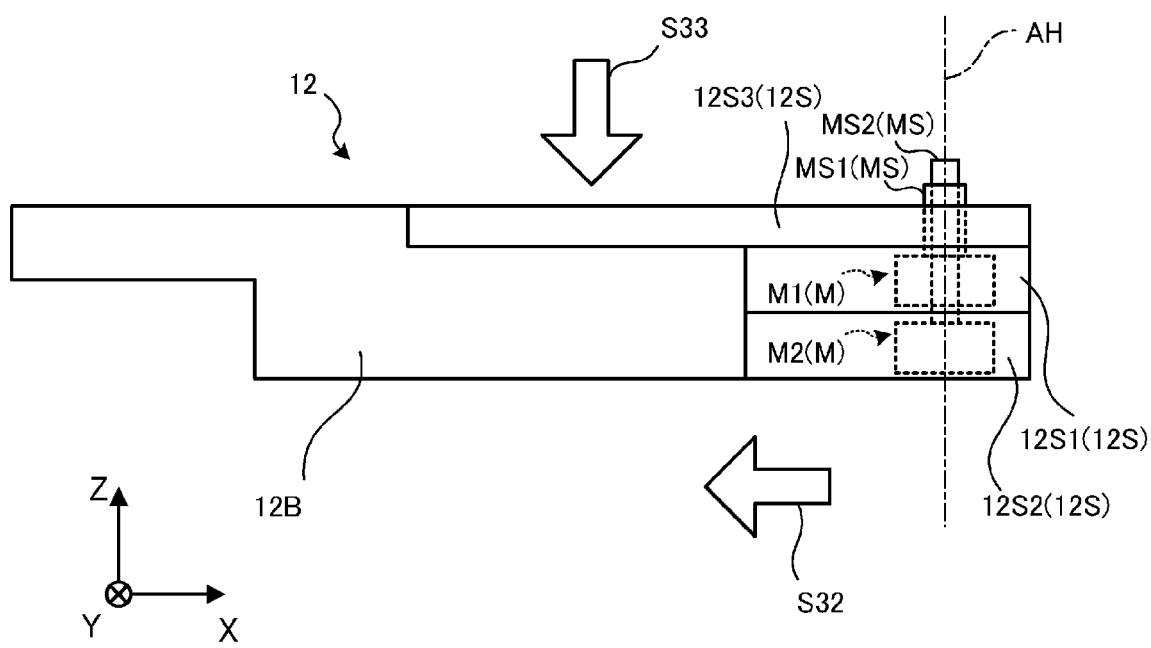
FIG. 5B is a schematic side view illustrating an assembled arm.

As illustrated in FIG. 5B, by moving the subframes 12S1 and 12S2 in the assembled state toward the base frame 12B of the second arm 12 (see, e.g., a direction S32), the subframes 12S each having the built-in motor are combined with the base frame 12B.

Further, by combining a subframe 12S3 with the base frame 12B from above (see, e.g., a direction S33), the second arm 12 is completed. At this time, the subframe 12S3 is a unit that does not include the built-in hand drive motor M. The configuration of the subframe 12S3 will be described later using FIG. 6.

Here, each of the plurality of subframes 12S has an outer shape that makes up a portion of the outer shape of the second arm 12. That is, each of the plurality of subframes 12S has an outer surface that makes up the outer shape of the second arm 12. Further, the subframes 12S make up the outer shape of the portion of the second arm 12 that supports the hands 13 (see, e.g., FIG. 3), in a state where the subframes 12S1 and 12S2 having the built-in hand drive motors M are stacked such that the hand drive motors M become concentric with the motor axis AH.

In this way, when the outer shape of each subframe 12S serves as a portion of the outer shape of the second arm 12 in the assembled state, the number of parts of the second arm 12 may be reduced, so that the second arm 12 may be downsized.

Figure 6:
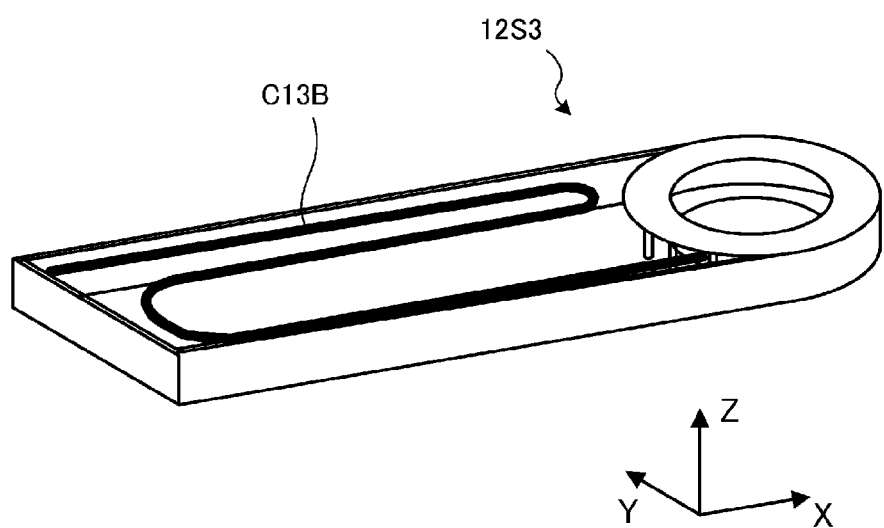
FIG. 6 is a schematic perspective view illustrating a subframe having no built-in motor.

Next, the configuration of the subframe 12S3 illustrated in FIG. 5B will be described using FIG. 6. FIG. 6 is a schematic perspective view illustrating the subframe 12S that includes no built-in motor. FIG. 6 illustrates a state where the cover of the upper surface is removed in order to depict the internal configuration of the subframe 12S.

As illustrated in FIG. 6, the subframe 12S3 is a unit that accommodates a cable C13B connected to the hand 13B (see, e.g., FIG. 3). When the hand 13B pivots, the cable C13B is wound around the pivoting axis of the hand 13B. Here, the cable C13B accommodated in the subframe 12S has a sufficient length to the extent that the hand 13B has a sufficient pivoting angle.

For example, as illustrated in FIG. 6, the sufficient length may be secured by storing the cable C13B in the subframe 12S in a posture of being bent in an S or inverted S shape when viewed from above.

Here, as illustrated in FIG. 5B, the hand drive motor M is the so-called direct drive motor, so that it is unnecessary to provide a mechanism such as a belt for transmitting a drive power to the second arm 12. Accordingly, as compared to a case where a belt is provided, the volume of the subframe 12S may be increased, and the length of the cable C13B that may be accommodated may be increased.

This configuration contributes to widening the pivoting angle range of the hand 13B (see, e.g., FIG. 3). Further, when the hand drive motor M is the direct drive motor, instead of providing a belt, a design modification for changing the arm length of the second arm 12 may be easily performed.

Next, descriptions will be made on the case where the hand drive motor M illustrated in FIG. 1, etc., is the axial gap motor, using FIGS. 7 to 9. FIG. 7 is an exploded perspective view of a first motor unit 100, and FIG. 8 is an exploded perspective view of a second motor unit 200. FIG. 9 is a schematic lateral cross-sectional view of the assembled second arm 12.

Figure 7:
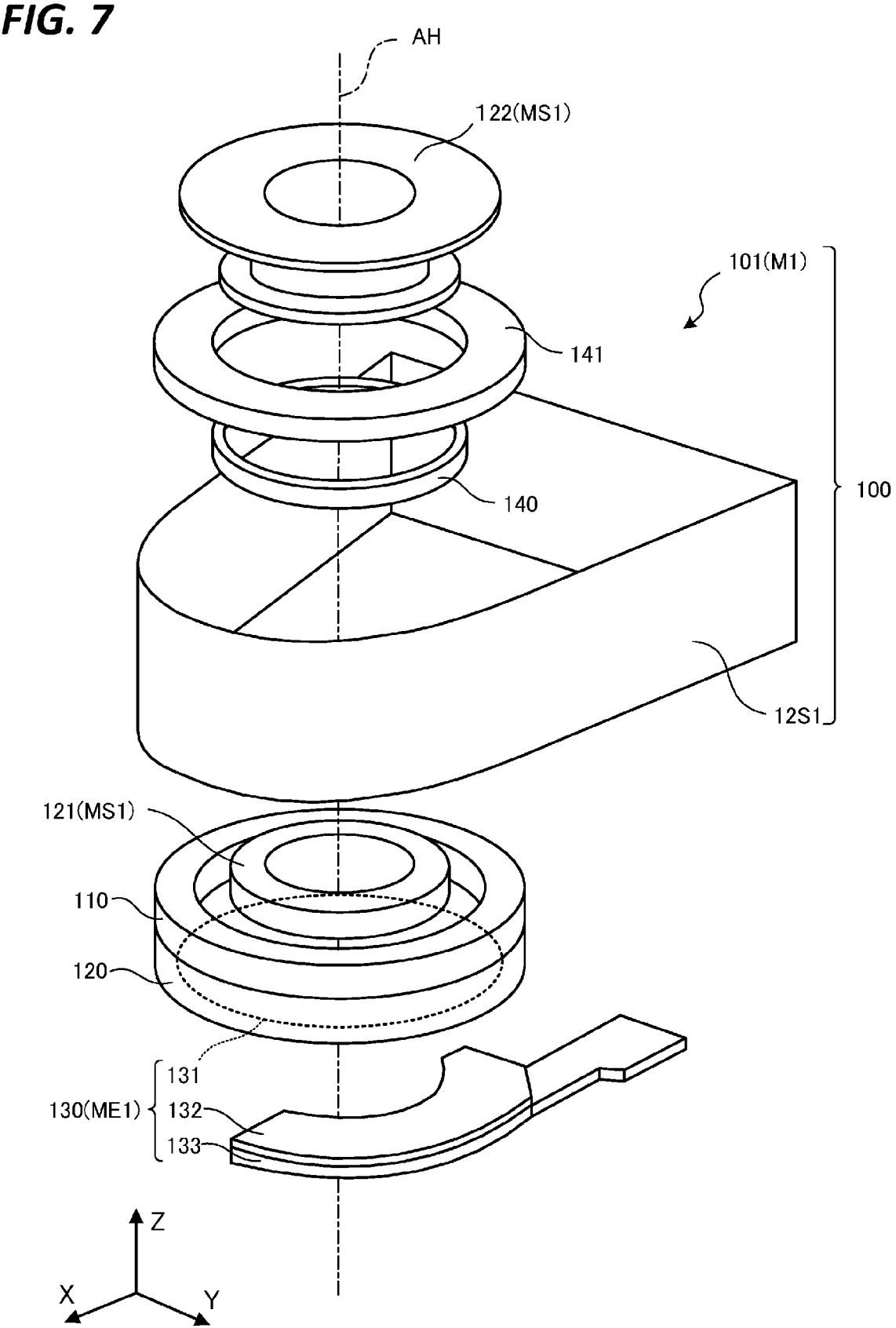
FIG. 7 is an exploded perspective view illustrating a first motor unit.

As illustrated in FIG. 7, the first motor unit 100 includes a first motor 101 that corresponds to the hand drive motor M1 illustrated in FIG. 1, etc., and the subframe 12S1 illustrated in FIG. 5A, etc. While the upper and lower surfaces of the subframe 12S1 are opened, a removable cover is provided on the upper surface.

A communication hole may be appropriately formed in the side surface of the subframe 12S1 that is connected to the base frame 12B (see, e.g., FIG. 5B). FIG. 7 omits the illustration of, for example, an inner wall provided inside the subframe 12S1 such that each component of the first motor 101 is attached to the inner wall.

The first motor 101 includes a stator 110 and a rotor 120 that correspond to the stator and the rotor of the axial gap motor, respectively. The first motor 101 further includes a hollow shaft 121 that corresponds to the hollow shaft MS1 illustrated in FIG. 1, etc., a boss 122, a bearing 140, and a bearing presser 141.

The first motor 101 further includes an encoder 130 that corresponds to the encoder ME1 illustrated in FIG. 1, etc. The encoder 130 includes a disk portion 131, a detection portion 132, and a support portion 133.

The stator 110 has a disk shape with a hollow following the motor axis AH, and includes teeth at the end surface thereof facing the rotor 120 and wires wound around the teeth. The stator 110 is molded after the wires are wound around the teeth. The rotor 120 has an end surface that faces the end surface of the stator 110, and a hollow that communicates with the hollow of the stator 110.

A plurality of magnets is provided on the end surface of the rotor 120 that faces the stator 110, along the circumferential direction. The disk portion 131 of the encoder 130 is fixed to the other end surface of the rotor 120. In the disk portion 131 as well, a hollow is formed to communicate with the hollow of the rotor 120.

As illustrated in FIG. 7, the hollow shaft 121 is fixed to the upper surface of the rotor 120. The stator 110 is disposed such that the inner periphery thereof is spaced apart from the outer periphery of the hollow shaft 121. The bearing 140 is a so-called cross roller bearing. By using the cross roller bearing as the bearing 140, both a high rigidity and a downsizing may be implemented.

For example, the inner periphery of the bearing 140 is fixed to the outer periphery of the hollow shaft 121, and the outer periphery of the bearing 140 is fixed to the subframe 12S1 by the bearing presser 141. FIG. 7 omits the illustration of the inner wall of the subframe 12S1 to which the bearing 140 is fixed. The boss 122 is fixed to the upper surface of the hollow shaft 121, such that the hollow of the boss 122 communicates with the hollow of the hollow shaft 121.

The detection portion 132 of the encoder 130 is disposed such that the end surface thereof faces the end surface of the disk portion 131 provided on the end surface of the rotor 120. The support portion 133 supports the other end surface of the detection portion 132, and is fixed to the subframe 12S1. The support portion 133 may have a shape fixable to the stator 110, so as to be fixed to the stator 110.

As described above, the first motor 101 includes the disk-shaped stator 110 having the hollow along the motor axis AH, and the disk-shaped rotor 120 having the hollow with the end surface thereof facing the end surface of the stator 110.

The first motor 101 further includes the hollow shaft 121 connected to the rotor 120 so as to communicate with the hollow of the rotor 120, and extending along the motor axis AH, and the boss 122. The hollow shaft 121 of the first motor 101 is provided on the side of the rotor 120 that faces the stator 110, and extends along the motor axis AH by passing through the hollow of the stator 110.

As illustrated in FIG. 7, when the stator 110, the rotor 120, the hollow shaft 121, and the boss 122 have the hollow structure, wires, or a shaft of a motor of another unit may be disposed in the hollow, so that the arm may be downsized.

Figure 8:
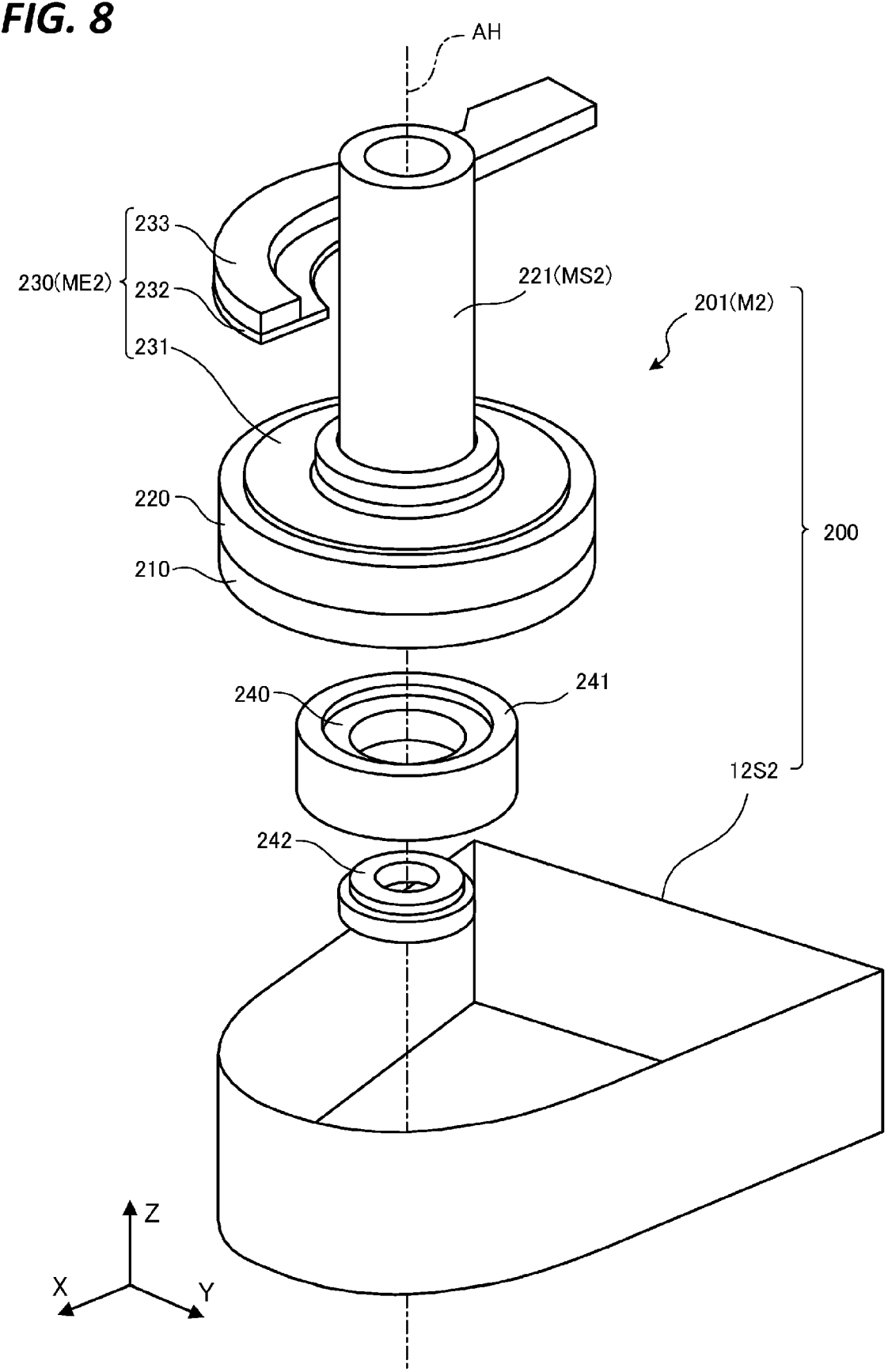
FIG. 8 is an exploded perspective view illustrating a second motor unit.

As illustrated in FIG. 8, the second motor unit 200 includes a second motor 201 that corresponds to the hand drive motor M2 illustrated in FIG. 1, etc., and the subframe 12S2 illustrated in FIG. 5A, etc. The upper surface of the subframe 12S2 is opened. A removable cover may be provided on the upper surface.

A communication hole may be appropriately formed in the side surface of the subframe 12S2 that is connected to the base frame 12B (see, e.g., FIG. 5B). FIG. 8 omits the illustration of, for example, the inner wall provided inside the subframe 12S2 such that each component of the second motor 201 is attached to the inner wall.

The second motor 201 includes a stator 210 and a rotor 220 that correspond to the stator and the rotor of the axial gap motor, respectively. The second motor 201 further includes a hollow shaft 221 that corresponds to the hollow shaft MS2 illustrated in FIG. 1, etc., a bearing 240, an outer periphery presser 241, and an inner periphery presser 242. Here, the outer periphery presser 241 is a component that presses the outer periphery of the bearing 240, and the inner periphery presser 242 is a component that presses the inner periphery of the bearing 240.

The second motor 201 further includes an encoder 230 that corresponds to the encoder ME2 illustrated in FIG. 1, etc. The encoder 230 includes a disk portion 231, a detection portion 232, and a support portion 233.

The stator 210 has a disk shape with a hollow following the motor axis AH, and includes teeth at the end surface thereof facing the rotor 220 and wires wound around the teeth. The stator 210 is molded after the wires are wound around the teeth. The rotor 220 has an end surface that faces the end surface of the stator 210, and a hollow that communicates with the hollow of the stator 210.

A plurality of magnets is provided on the end surface of the rotor 220 that faces the stator 210, along the circumferential direction. The disk portion 231 of the encoder 230 is fixed to the other end surface of the rotor 220. In the disk portion 231, a hollow is formed, through which the hollow shaft 221 passes.

As illustrated in FIG. 8, the hollow shaft 221 is fixed to the upper surface of the rotor 220. The bearing 240 is a so-called cross roller bearing. By using the cross roller bearing as the bearing 240, both the high rigidity and the downsizing may be implemented. For example, the inner periphery of the bearing 240 is fixed to the outer periphery of the hollow shaft 221 by the inner periphery presser 242, and the outer periphery of the bearing 240 is fixed to the subframe 12S2 by the outer periphery presser 241.

The detection portion 232 of the encoder 230 is disposed such that the end surface thereof faces the end surface of the disk portion 231 provided on the end surface of the rotor 220. The support portion 233 supports the other end surface of the detection portion 232, and is fixed to the subframe 12S2. The support portion 233 may have a shape fixable to the stator 210, so as to be fixed to the stator 210.

As described above, the second motor 201 includes the disk-shaped stator 210 having the hollow along the motor axis AH, and the disk-shaped rotor 220 having the hollow with the end surface thereof facing the end surface of the stator 210.

The second motor 201 further includes the hollow shaft 221 connected to the rotor 220 so as to communicate with the hollow of the rotor 220, and extending along the motor axis AH. The hollow shaft 221 of the second motor 201 is fixed to the end surface of the rotor 220 opposite to the stator 210, and extends in the direction away from the stator 210 along the motor axis AH.

As illustrated in FIG. 8, when the stator 210, the rotor 220, and the hollow shaft 221 have the hollow structure, wires, or a shaft of a motor of another unit may be disposed in the hollow, so that the arm may be downsized.

Next, descriptions will be made on the second arm 12 in a state where the first motor unit 100 illustrated in FIG. 7 and the second motor unit 200 illustrated in FIG. 8 are assembled, using FIG. 9. FIG. 9 is a schematic lateral cross-sectional view of the assembled second arm 12. FIG. 9 corresponds to a cross-sectional view taken by cutting the second arm 12 along the plane parallel to the YZ plane at the position of the motor axis AH, when the second arm 12 is viewed in the direction from the distal end toward the proximal end thereof. In the following description, the configurations described above using FIGS. 7 and 8 will be omitted as appropriate.

Figure 9:
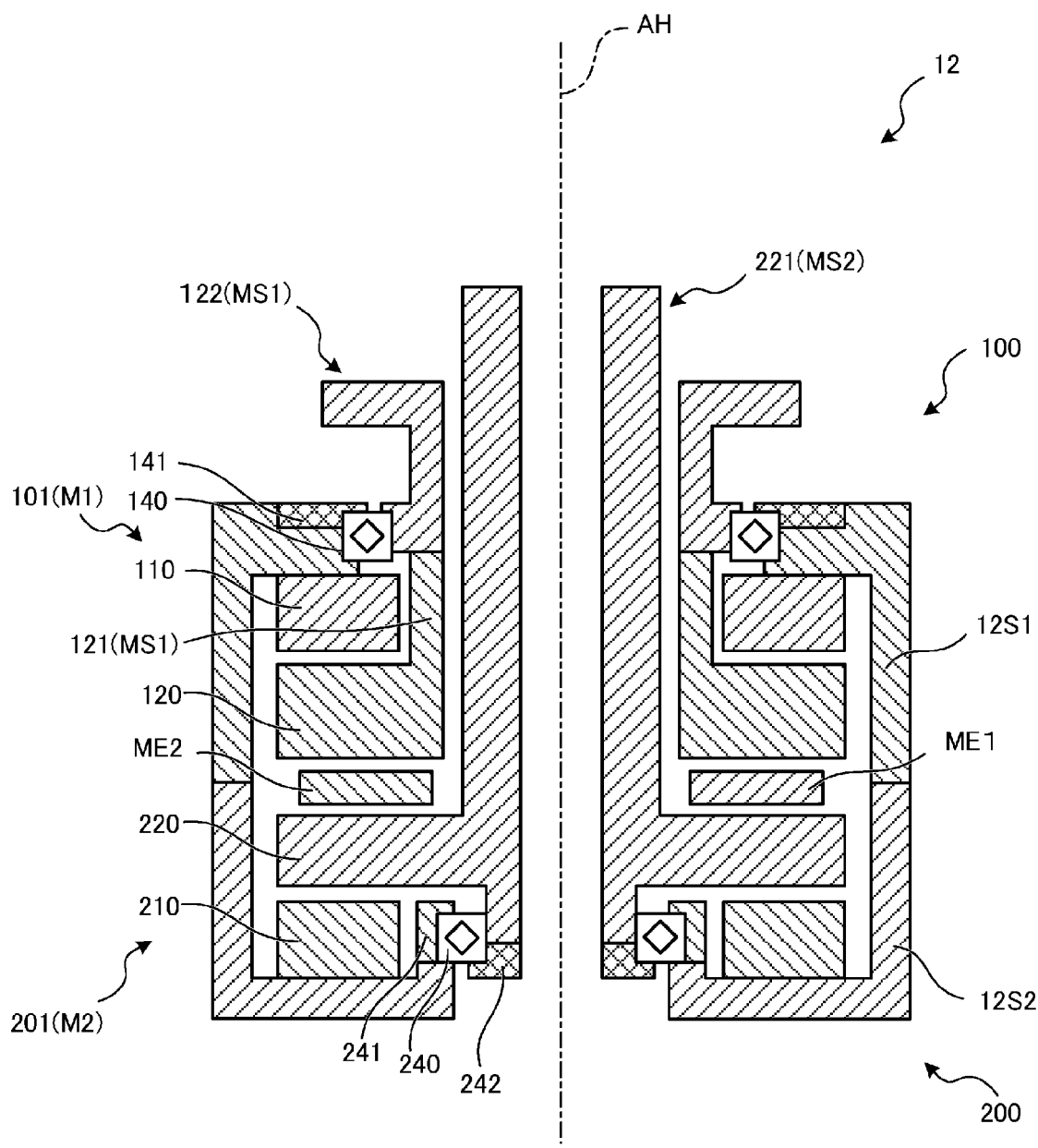
FIG. 9 is a schematic lateral cross-sectional view of an assembled second arm.

As illustrated in FIG. 9, the first motor unit 100 and the second motor unit 200 are each symmetrical with respect to the motor axis AH, except for the encoders ME1 and ME2. The encoders ME1 and ME2 are provided at positions facing each other with respect to the motor axis AH. FIG. 9 omits the illustration of the inner walls of the subframes 12S1 and 12S2, to which the encoders ME1 and ME2 are fixed respectively.

The boss 122 of the first motor unit 100 protrudes from the upper surface of the second arm 12. The hollow shaft 221 of the second motor unit 200 protrudes from the upper surface of the second arm 12 through the hollow of the first motor unit 100.

Here, the respective components are arranged along the motor axis AH in an order of the stator 210 and the rotor 220 of the second motor 201, and the rotor 120 and the stator 110 of the first motor 101, from the lower surface toward the upper surface of the second arm 12.

The encoder ME1 of the first motor unit 100 is disposed at a position facing the lower surface of the rotor 120 in the first motor unit 100, and the encoder ME2 of the second motor unit 200 is disposed at a position facing the upper surface of the rotor 220 in the second motor unit 200. As illustrated in FIG. 9, the encoders ME1 and ME2 are disposed at substantially the same height in the direction along the motor axis AH.

As described above, in the first motor 101, which is one of the hand drive motors M, the hollow shaft 121 and the boss 122 that make up the hollow shaft extend through the hollow of the stator 110 of the first motor 101. In the second motor 201, which is one of the hand drive motors M, the hollow shaft 221 extends away from the stator 210 of the second motor 201.

The second arm 12 includes therein each of the first motor 101 and the second motor 201, in the posture where the hollow shaft 221 extending away from the stator 210 passes through the hollow shaft 121 and the boss 122 that extend through the hollow of the stator 110. That is, the first motor 101 and the second motor 201 are built in one arm, in the posture where the hollow shaft 221 extending away from the stator 210 passes through the hollow shaft 121 extending through the hollow of the stator 110.

In this way, the first motor 101 and the second motor 201 are arranged such that the hollow shaft 221 extending away from the stator 210 passes through the hollow shaft 121 extending through the hollow of the stator 110. Therefore, the height of the second arm 12 with the built-in motors may be reduced.

As illustrated in FIG. 9, the first motor 101 and the second motor 201 each have a hollow passing through the second arm 12 from the lower surface toward the upper surface thereof, along the motor axis AH. In the hollow, for example, the cable for the hand 13B (see, e.g., FIG. 3) connected to the hollow shaft 221 of the second motor unit 200 may be routed.

FIG. 9 illustrates the nested arrangement of the hollow shafts of the two motors, but when three or more motors are coaxially arranged, each motor may be arranged to include at least one nested arrangement as illustrated in FIG. 9.

Figure 10:
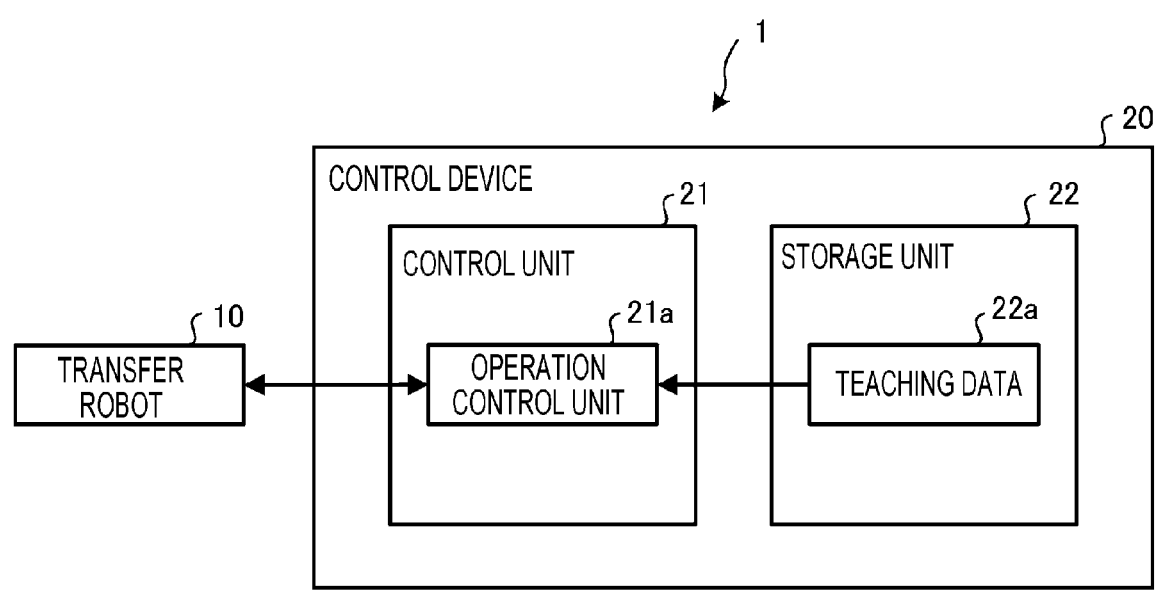
FIG. 10 is a block diagram of a robot system.

Next, descriptions will be made on a robot system 1, which includes the transfer robot 10 and a control device 20 that controls the operation of the transfer robot 10, using FIG. 10. FIG. 10 is a block diagram of the robot system 1. Since the configuration of the transfer robot 10 has been described, descriptions will be made focusing on the configuration of the control device 20. FIG. 10 omits an input terminal device, such as a pendant, connected to the control device 20.

As illustrated in FIG. 10, the control device 20 includes a control unit 21 and a storage unit 22. The control unit 21 includes an operation control unit 21a. The storage unit 22 stores teaching data 22a. The control device 20 is connected to the transfer robot 10.

Here, the control device 20 includes a computer with, for example, a CPU (central processing unit), a ROM (read only memory), a RAM (random access memory), a HDD (hard disk drive), and an input/output port, or various circuits. For example, the CPU of the computer reads and executes programs stored in the ROM, so as to function as the operation control unit 21a of the control unit 21.

The operation control unit 21a of the control unit 21 may be configured with hardware such as an ASIC (application specific integrated circuit) or an FPGA (field programmable gate array).

The storage unit 22 corresponds, for example, to the RAM or HDD. The RAM or HDD may store the teaching data 22a. The control device 20 may acquire the programs described above or various types of information through another computer or a portable recording medium connected by a wired or wireless network.

The control unit 21 of the control device 20 controls the operation of the transfer robot 10 based on the teaching data 22a. When an error occurs in the operation of the transfer robot 10, the control unit 21 performs a process of inhibiting the operation of the transfer robot 10.

The operation control unit 21a controls the operation of the transfer robot 10 based on the teaching data 22a. Specifically, the operation control unit 21a makes instructions to the motors corresponding to the respective axes in the transfer robot 10 based on the teaching data 22a stored in the storage unit 22, thereby causing the transfer robot 10 to transfer a transfer target object such as a substrate.

Further, the operation control unit 21a, for example, performs a feedback control by using encoder values in the motors, so as to improve the operation accuracy of the transfer robot 10.

The teaching data 22a is information that is generated in a teaching step for teaching an operation to the transfer robot 10, and includes "jobs" that define the operation of the transfer robot 10, including the movement trajectory of the hands 13 (see, e.g., FIG. 1). The teaching data 22a may be generated by another computer connected through a wired or wireless network and stored in the storage unit 22.

As described above, the transfer robot 10 according to the present embodiment includes the plurality of hands 13 and the second arm 12. The plurality of hands 13 may hold a transfer target object, and pivot individually around the same axis. The second arm 12 supports the plurality of hands 13. The second arm 12 supports the plurality of hands 13 on the upper surface of the distal end thereof, and includes therein the plurality of hand drive motors M that directly drive the plurality of hands 13, respectively, in the posture of being aligned in the direction along the motor axis AH while being concentric with the motor axis AH.

In this way, the plurality of hand drive motors M that directly drive the hands 13, respectively, are built in one arm in the posture of being aligned in the direction along the motor axis AH while being concentric with the motor axis AH, so that the space for accommodating the hand drive motors M may be reduced. Therefore, the downsizing of an arm may be implemented.

According to an aspect of the present disclosure, it is possible to provide a transfer robot and a robot system, which may implement the downsizing of an arm.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transfer robot comprising:
a plurality of hands capable of holding a transfer target object, and configured to pivot individually around a pivoting axis;
a plurality of hand drive motors arranged in a direction along the pivoting axis, such that a motor axis to which the plurality of hands are each connected becomes concentric with the pivoting axis, and configured to directly drive the plurality of hands, respectively, without using a driving mechanism including a belt for transmitting a driving force; and
an arm extending in a direction perpendicular to the pivoting axis and including therein the plurality of hand drive motors.

2. The transfer robot according to claim 1, wherein the plurality of hand drive motors each include an encoder on a side surface thereof in a direction along the motor axis, and are built in the arm in a posture in which the encoders face each other.

3. The transfer robot according to claim 2, wherein the arm includes a plurality of subframes arranged along the motor axis, on a side of the plurality of hands,
the plurality of subframes include therein the plurality of hand drive motors on a one-to-one basis, and
the plurality of subframes are configured to be disassembled along the motor axis.

4. The transfer robot according to claim 3, wherein each of the plurality of subframes has an outer surface that makes up an outer shape of the arm on the side of the plurality of hands.

5. The transfer robot according to claim 2, wherein the encoder includes
a disk portion having a disk shape and fixed to an end surface of a rotor of each of the plurality of hand drive motors, and
a detection portion fixed to a stator of each of the plurality of hand drive motors or the arm, having an end surface facing an end surface of the disk portion, and having a shape fitted into a semicircular-disk outer shape obtained by equally dividing the disk portion, and
with respect to the encoders provided in the plurality of hand drive motors, respectively, the plurality of hand drive motors are built in the arm, in a posture in which the end surface of the disk portion of the encoder faces an end surface of a disk portion of another encoder across detection portions of the encoders, and side surfaces of the detection portions of the encoders face each other across the motor axis.

6. The transfer robot according to claim 1, wherein the plurality of hand drive motors each include a hollow shaft connected to a rotor thereof and extending along the motor axis, and are built in the arm in a posture in which the hollow shaft of one of the plurality of hand drive motors is inserted into the hollow shaft of another of the plurality of hand drive motors.

7. The transfer robot according to claim 6, wherein in the hollow shafts of the plurality of hand drive motors, a first hollow shaft pivots a first hand of the hands, and a second hollow shaft, which is positioned in an inner side than the first hollow shaft, pivots a second hand positioned in an upper side than the first hand.

8. The transfer robot according to claim 1, wherein the plurality of hand drive motors are each an axial gap motor.

9. The transfer robot according to claim 8, wherein each of the plurality of hand drive motors includes
a stator having a disk shape with a hollow along the motor axis,
a rotor having a disk shape with a hollow while having an end surface facing an end surface of the stator, and
a hollow shaft connected to the rotor to communicate with the hollow of the rotor, and extending along the motor axis.

10. The transfer robot according to claim 9, wherein
in at least one of the plurality of hand drive motors, the hollow shaft extends through the hollow of the stator of the corresponding hand drive motor,
in at least one of remaining hand drive motors, the hollow shaft extends away from the stator of the corresponding hand drive motor, and
the plurality of drive hand motors are built in the arm in a posture in which the hollow shaft extending away from the stator passes through the hollow shaft extending through the hollow of the stator.

11. A robot system comprising:
transfer robot according to claim 1, and
a controller configured to control an operation of the transfer robot.

12. The transfer robot according to claim 1, wherein the arm includes a first arm and a second arm, the first arm is linked to the second arm at a first end of the second arm, the plurality of hands is provided on a second end of the second arm, and the plurality of hand drive motors are positioned within the second arm.

13. The robot system according to claim 11, wherein the arm includes a first arm and a second arm, the first arm is linked to the second arm at a first end of the second arm, the plurality of hands is provided on a second end of the second 
arm, and the plurality of hand drive motors are positioned within the second arm.

14. A transfer robot comprising:
a plurality of hands capable of holding a transfer target object, and configured to pivot individually around a pivoting axis;
a plurality of hand drive motors arranged in a direction along the pivoting axis, such that a motor axis to which the plurality of hands are each connected becomes concentric with the pivoting axis, and configured to directly drive the plurality of hands, respectively; and
an arm including therein the plurality of hand drive motors, and a plurality of subframes arranged along the motor axis, on a side of the plurality of hands,
wherein the plurality of subframes include therein the plurality of hand drive motors on a one-to-one basis, and
the plurality of subframes are configured to be disassembled along the motor axis.

15. The transfer robot according to claim 14, wherein the plurality of hand drive motors each include an encoder on a side surface thereof in a direction along the motor axis, and are built in the arm in a posture in which the encoders face each other.

16. A transfer robot comprising:
a plurality of hands capable of holding a transfer target object, and configured to pivot individually around a pivoting axis;
a plurality of hand drive motors arranged in a direction along the pivoting axis, such that a motor axis to which the plurality of hands are each connected becomes concentric with the pivoting axis, and configured to directly drive the plurality of hands, respectively; and
an arm including therein the plurality of hand drive motors,
wherein the plurality of hand drive motors each include an encoder on a side surface thereof in a direction along the motor axis, and are built in the arm in a posture in which the encoders face each other,
wherein the encoder includes:
a disk portion having a disk shape and fixed to an end surface of a rotor of each of the plurality of hand drive motors;
a detection portion fixed to a stator of each of the plurality of hand drive motors or the arm, having an end surface facing an end surface of the disk portion, and having a shape fitted into a semicircular-disk outer shape obtained by equally dividing the disk portion; and
with respect to the encoders provided in the plurality of hand drive motors, respectively, the plurality of hand drive motors are built in the arm, in a posture in which the end surface of the disk portion of the encoder faces an end surface of a disk portion of another encoder across detection portions of the encoders, and side surfaces of the detection portions of the encoders face each other across the motor axis.

* * * * *